May 7, 1968  B. I. ULINSKI  3,381,836
FORK REACH MECHANISM

Filed Oct. 5, 1965  4 Sheets-Sheet 1

INVENTOR.
BRONISLAUS I. ULINSKI
BY
Pragno, Sadler & Teddy
ATTORNEY

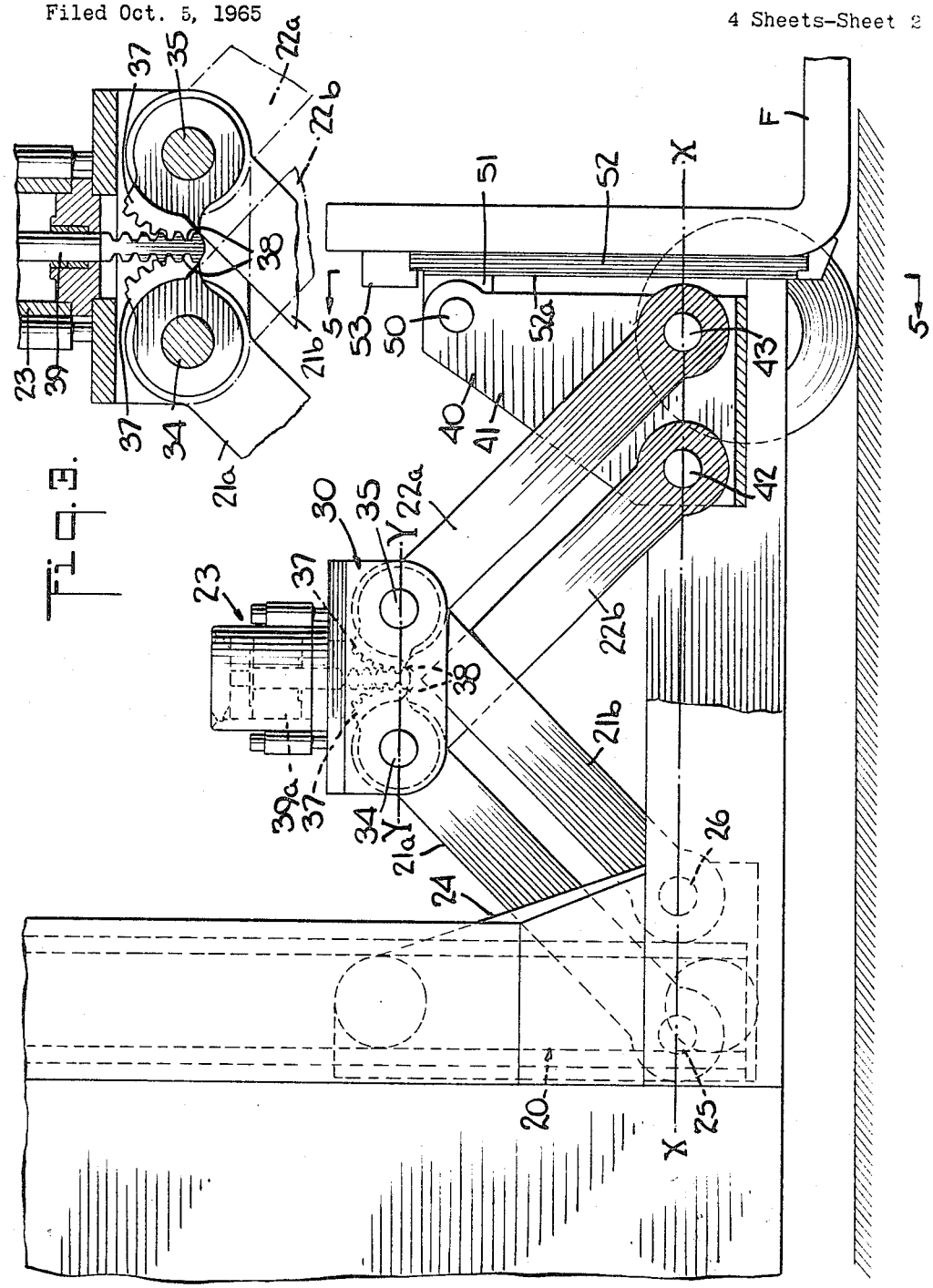

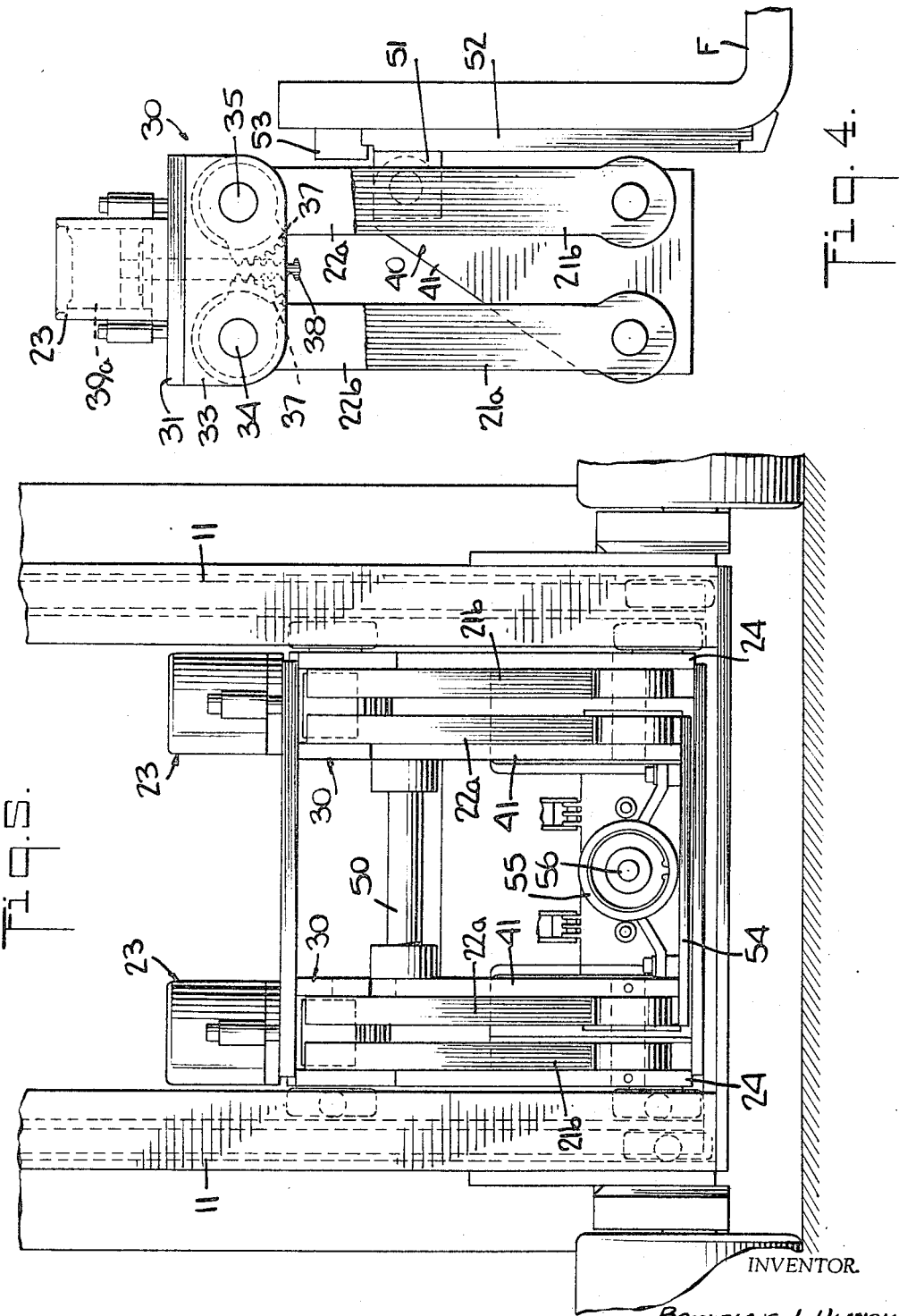

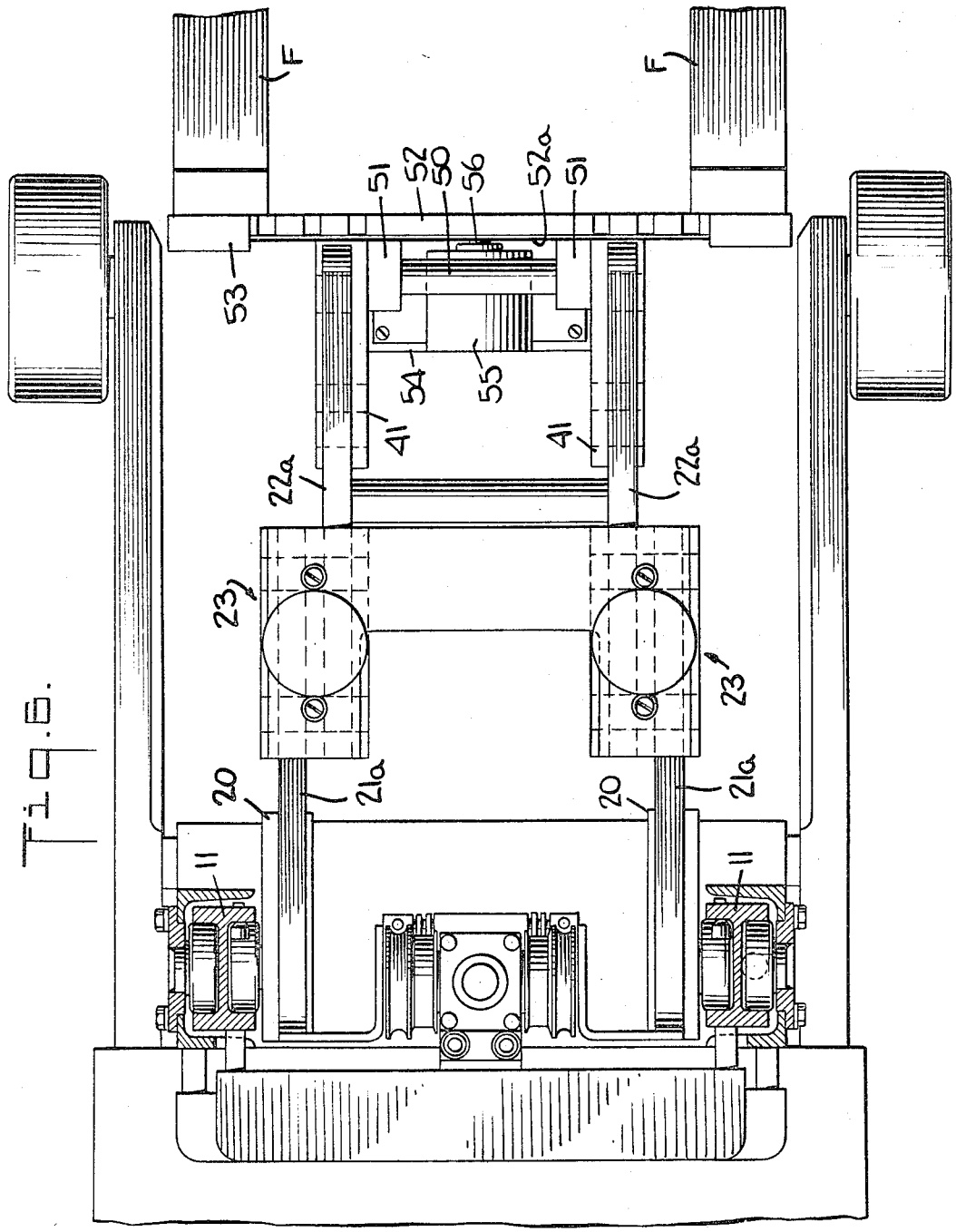

3,381,836
FORK REACH MECHANISM
Bronislaus I. Ulinski, Jenkintown, Pa., assignor to Eaton Yale & Towne, Inc., a corporation of Ohio
Filed Oct. 5, 1965, Ser. No. 492,995
4 Claims. (Cl. 214—730)

ABSTRACT OF THE DISCLOSURE

A truck fork reach mechanism is connected to load supports movable on the uprights of the truck and consists of two sets of links each having a pair of upper and lower links arranged in the same plane. The load carrier and the links attached to the load carrier are offset so that in fully retracted position the load carrier is nested between the load supports and uprights.

---

This invention relates to an industrial truck and more particularly to an improved fork reach mechanism for projecting and retracting load forks or a load platform relatively to a vertically moving carriage on such trucks.

Mechanisms for projecting a load platform or load forks are very old in the art and numerous patents have been issued covering this type of construction. However, insofar as I am aware, no desirable construction has as yet been developed which contributes the highly desirable results of this invention, while being extremely simple. Thus, I utilize two pairs of links, with one pair of links pivoted to the lifting carriage of the truck and the other pair of links pivoted to the load platform or load forks. Through the novel manner of interconnecting those ends of the links opposed to the ends pivoted to the carriage and load forks, I obtain very important results as set forth hereinafter.

As one feature of my invention, I am able to obtain a very considerable projection of the load forks and while at the same time permitting nesting of the reach mechanism in retracted position so as to effect a reduction in the overall effective length of the truck.

As a further feature of my invention, the interconnection between those ends of the links opposed to the ends pivoted to the carriage and load forks is such that all the links can be controlled merely by controlling selective links. Furthermore, the points of pivotal connection at the foregoing interconnection of the links is such that the interconnection accepts shear forces and thus improves the lateral stability and durability of the reach mechanism without utilizing slideable pivots.

As a further feature of my invention, the linkage mechanism will contribute substantial level projection of the load forks by means of sets of links which are so interconnected and overlapped that added rigidity is provided and a higher degree of safety achieved in the event of failure of a part of the reach mechanism.

I have thus outlined rather broadly the important features of my invention in order that the detailed description thereof may be better understood and in order that my contribution in the art may be better appreciated. There are, of course, additional features of my invention that will be described hereinafter and which will form the subject of the claims appended hereto. Those skilled in the art will appreciate that the conception on which my disclosure is based may readily be utilized as a basis for designing of other structures for carrying out the several purposes of my invention. It is important, therefore, that the claims be regarded as including such equivalent constructions as do not depart from the spirit and scope of my invention, in order to prevent the appropriation by those skilled in the art.

In the drawings:

FIGURE 2 is a side elevational view, partly broken away, and in section, and showing the improved reach means.

FIGURE 3 is an enlarged section showing the mechanism for pivoting the link arms.

FIGURE 4 is a view similar to FIGURE 2, but showing the fork reach mechanism in fully retracted position.

FIGURE 5 is a sectional view taken substantially on the lines 5—5 of FIGURE 3.

FIGURE 6 is a plan view of the mechanism shown in FIGURE 1.

Figure 1:
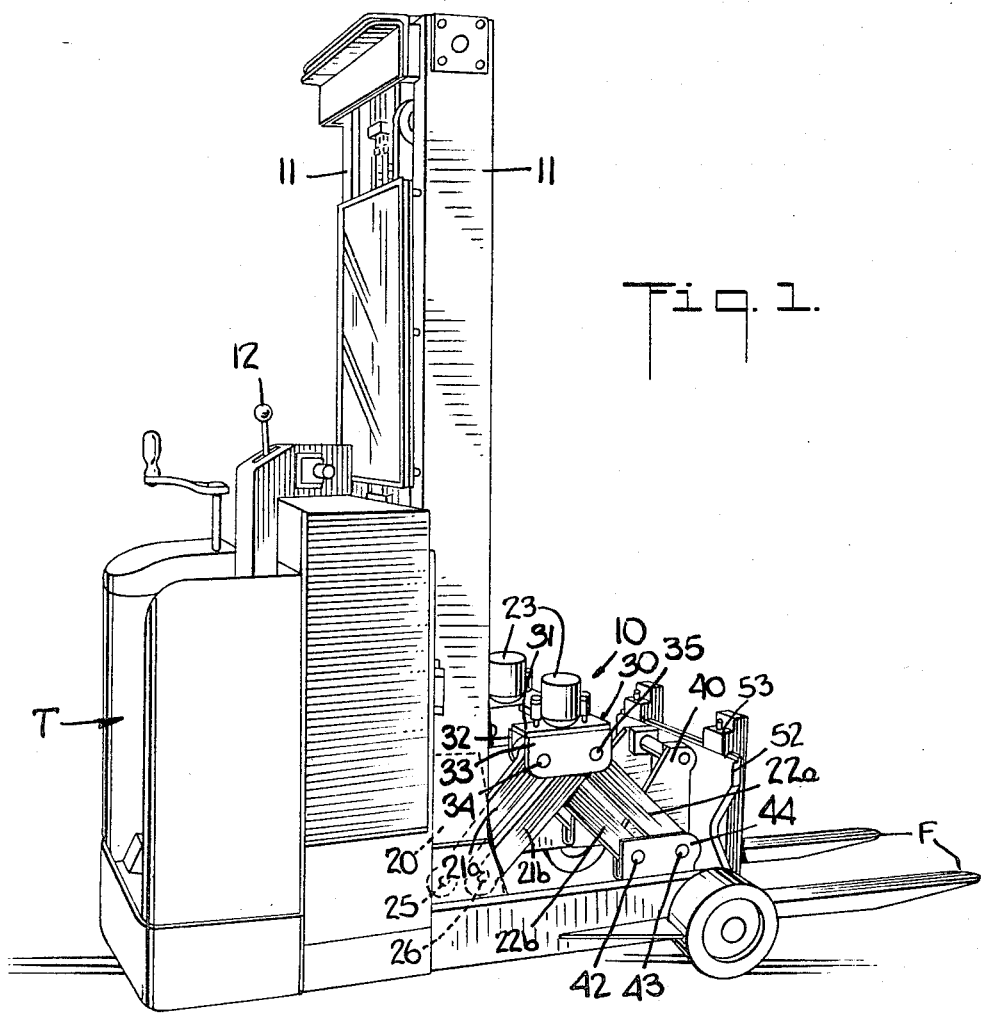
FIGURE 1 is a perspective view of the improved fork lift means attached to a conventional industrial truck.

Referring now to the drawings, and in particular to FIGURE 1, my improved fork reach mechanism, generally designated by the numeral 10, is mounted for vertical movement on the uprights 11 that are provided on the forward end of truck T, with raising or lowering of the fork reach mechanism 10 within the uprights 11 being accomplished in known fashion by operation of a control handle 12 for example. The lifting mechanism just mentioned forms no part of my present invention per se, and will accordingly not be described in detail.

Referring again to FIGURE 1, the fork reach mechanism 10 includes generally a first support member 20, a second support member 30, and a third support member 40, with a pair of parallel link arms 21a, 21b interconnecting support members 20 and 30, while a second pair of parallel link arms 22a, 22b interconnects the support members 30 and 40. Actuation of the reach mechanism 10 between the positions of FIGURES 2 and 4 will occur upon operation of actuating mechanism 23 that is carried by the support member 30 as will presently be described.

In this regard, and before proceeding further, it should be noted that while the support members 20 and 40 are made up of a single component, that the width of these support members is such that the opposed edges of the same are each interconnected by a linkage assembly that includes, in each instance, link arms 21a, 21b, link arms 22a, 22b and support member 30, with two such linkage mechanisms being shown in the preferred form of the embodiment herein illustrated. Duplicate numbers have been used to identify the port and starboard linkage mechanisms.

Referring now to FIGURES 3, 5 and 6, the support member 20 is of generally U-shaped configuration in horizontal cross section with each lateral side including a triangular shaped upright 24 (see FIGURE 2), to which the lower ends of the pair of link arms 21a and 21b may be pinned, as by shafts 25 and 26. The shafts 25 and 26 have their axis disposed in a common horizontal plane that is indicated by the line X—X in FIGURE 2 of the drawings.

Referring now to FIGURE 1, a generally similar configuration exists with respect to the support member 40, which includes upright plates 41, 41 to which are pinned the lower ends of the links 22a and 22b for pivotal rotation about shafts 42 and 43. The axis of shaft 42 and 43 are disposed in a common horizontal plane defined by the line X—X in FIGURE 2. Thus, the axes of rotation for the lower ends of all of the link arms lie in a common horizontal plane.

As shown in FIGURE 1, each plate 41 has its outermost side edge portion defined by an upturned return flange 44, which serves to define a pocket within which the arms 22a and 22b may be slideably supported against transverse forces that would otherwise impart a shear load on the shafts 42, 43.

To the end of achieving a "nested" condition upon full retraction of the reach mechanism, it will be noted from FIGURES 1 and 6 that the links 21a and 21b are disposed in a common vertical plane, with the links 22a and 22b similarly also disposed in a second common vertical plane that is transversely offset inboard of the first plane. In this manner and by making the support plate 40 narrower than the support plate 20, full nesting of support 40 within support 20 can be achieved upon complete retraction to the position shown in FIGURE 4.

Turning now to FIGURES 1, 2, 3, 4 and 7 for a description of the manner of interconnecting the upper ends of the link arms to a support plate 30, it will first be noted from FIGURE 1, that the support plate 30 is of generally U-shaped configuration in vertical cross section to form a base 31 and opposed leg sections 32 and 33. Shafts 34 and 35 extend between the just described leg sections 32 and 33 and the upper ends of the link arms are pinned around the shafts 34 and 35. The shaft 34 journals the upper end of link arm 21a and link arm 22b and the shaft 35 journals the upper end of link arm 21b and 22a. The shafts 34 and 35 lie in a common horizontal plane indicated by the line Y—Y in FIGURE 2, and with this arrangement just described it will be noted that six pivot points are provided in two horizontal planes and the pivot points are arranged in sets of two with the pivot points of each set spaced apart an equal distance.

Figure 7:
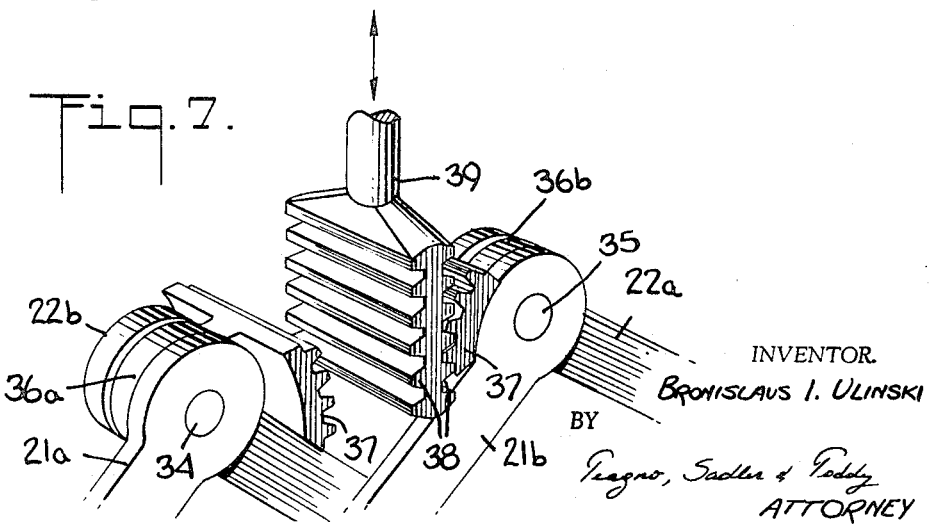
FIGURE 7 is a schematic view showing the actuating mechanism for pivoting the link arms.

Referring now to FIGURES 3 and 7, it has been previously indicated that an actuating mechanism 23 initiates angular variation between the link arms 21a and 21b and 22a and 22b. The upper ends of the link arms journalled to each shaft 34 and 35 are respectively separated by a spacer 36a and 36b which are welded or otherwise secured respectively to the link arms 22b and 21b. An integral gear sector 37 of arcuate configuration is formed on each spacer 36a and 36b. In this fashion, the sectors 37, 37 are enabled to mesh with the opposed gear racks 38, 38 that are provided on the projecting end of piston rod 39a extending downwardly from the ram 39 of the actuating mechanism 23.

Referring now to FIGURE 2, it will be noted that the rod 39a is in its retracted position with respect to the ram 39 that motivates the actuating mechanism 23. In FIGURE 4, where retraction has occurred, the piston 39a is in its extended position, with this arrangement being preferred because of the fact that greater force is required to retract the reach mechanism 10 and with the arrangement above described permitting utilization of the maximum efficiency of the cylinder during its power stroke for retraction purposes.

It should now be noted that the linkage and actuating structures just described, provide a built-in safety factor in the event that either ram 39 or link arms 22 should fail. For example, should the ram 39 in FIGURE 2 fail, a dropping movement of fork arms F, F would be limited to the distance the load would move to bring link arm 21 into engagement with link arm 21a. This safety arrangement is achieved by having the two link arms 21 and 21a connected to offset shafts 34 and 35 which are held in fixed position relative to each other by the support plate 30.

It has been previously indicated preferable to have a tilting arrangement exist with respect to the fork arms F, F and the reach mechanism 10. In this regard, it will be noted from FIGURES 1 and 6 that the opposed triangular upright support plates 41, 41 are bored adjacent their uppermost edge, to receive the opposed ends of the shaft 50. By this arrangement, bearing blocks 51, 51 that project from the rear face 52a of a front plate 52, can be journalled around the shaft 50 so as to in effect make the plate 52 pivotable around the axis of shaft 50. The fork arms F, F themselves are provided with hook type pads 53, 53 (FIGURES 1 and 2) that permit attachment of the same over the top edge 52b.

Referring now to FIGURES 5 and 6, it will be further noted in this regard that the support member 40 further includes a horizontal plate 54 that spans the opening between the uprights 41, 41 so as to serve as a support platform for a hydraulic tilt ram 55, with the tilt ram 55 having an extendible piston rod 56 that engages the rear face 52a so as to effectuate a tilting action of forks F, F upon being operated.

In use or operation of the improved fork reach mechanism 10, it will first be assumed that the component parts have been assembled to the condition shown in the drawings and further that the reach mechanism is in the extended position of FIGURE 2. At this time, retraction of the fork arms F, F is effectuated by operating the ram 39 of actuating mechanism 23 so as to extend the piston rod 39a to the fully extended position shown in FIGURE 4. Such linear movement of rod 39a during the power stroke will cause the arms 21 and 22 to be rotated around their points of pivotal connection and ultimately become parallel with each other as shown in FIGURE 4, with such rotation occurring because of the meshed engagement between the gear racks 38, 38 and sectors 37, 37. By reversing the direction of movement of rod 39a, the fork reach mechanism is returned to the extended position shown in FIGURE 2.

In the event the arms F, F are desired to be tilted upwardly, it is merely necessary to hydraulically operate the cylinder 55 so as to extend piston rod 56 and thus effectuate a tilting action of plate 52 around the axis of shaft 50.

I believe that the operation of my invention as earlier outlined will now be understood by those skilled in the art and that its considerable contribution will be fully appreciated.

I now claim:

1. In a truck of the class described, a load support, a load carrier, means mounting said load carrier for longitudinal projection and retraction relatively to said load support comprising a first set of upper and lower links arranged in coplanar relationship and pivoted at the lower ends thereof to said load support at spaced points, a second set of upper and lower links arranged in coplanar relationship and pivoted at the lower ends thereof to said load carrier at spaced points, a U-shaped member straddling and pivotably mounting the upper end of each of the upper links of each set to the upper end of the lower link of the other set, a gear sector mounted in fixed relationship to the upper end of one link of each set, and means on said mounting member for actuating a gear rack interposed between and meshing with said gear sectors, said gear to project and retract the load carrier.

2. A truck of the class described as claimed in claim 1 in which the load carrier is connected to the lower ends of the second set of links by a U-shaped member which straddles and pivotably mounts said lower ends.

3. In a truck of the class described, a pair of uprights, a load support mounted for vertical movement on each upright, a load carrier, a linkage mechanism mounting said load carrier for longitudinal projection and retraction relatively to said load support comprising two sets of links each set having a first pair of upper and lower links arranged in coplanar relationship and pivoted at the lower ends thereof to said load support at spaced points and a second pair of upper and lower links arranged in coplanar relationship and pivoted at the lower ends thereof to said load carrier at spaced points, means pivotably mounting the upper end of each of the upper links of each set to the upper end of the lower link of the other set, means for actuating said links to project and retract the load carrier, said second pairs of links and load carrier being offset laterally toward the center line of the truck relative to said first set of links so that in fully retracted position the load carrier is nested between said load supports and said uprights.

4. In a truck of the class described, vertical uprights, a plate mounted for vertical movement on each upright, a second plate, a load carrier mounted on said second plate, a linkage mechanism having two sets of links, each set comprising a pair of links pivoted at their lower ends in horizontally spaced relation to said first plate, said links being aligned in one vertical plane and a pair of similar links pivoted at their lower ends to said second plate in horizontally spaced relation, said links aligned also in one vertical plane that is offset laterally from the vertical plane of said first links, means for mounting and interconnecting the upper ends of said links whereby to form offset links that define a parallelogram connection between said plates, actuating means coacting with said links for swinging the links to retract and project the second plate relatively to said plate, the offset relationship of the planes of said first links and second links bringing the second plate into a position substantially between said uprights and in nested relationship to said first plate when said second plate is retracted.

References Cited

UNITED STATES PATENTS

| | | | |
|---|---|---|---|
| 2,672,249 | 3/1954 | Ulinski | 214—514 |
| 2,800,236 | 7/1957 | Schenkelberger | 214—730 X |
| 2,829,785 | 4/1958 | Pitts | 214—730 X |

FOREIGN PATENTS 987,637  3/1965  Great Britain.

GERALD M. FORLENZA, *Primary Examiner.*

ALBERT J. MAKAY, *Examiner.*